(12) United States Patent
Nilsson et al.

(10) Patent No.: US 9,318,003 B2
(45) Date of Patent: Apr. 19, 2016

(54) GAMING SYSTEM WITH FAILOVER AND TAKEOVER CAPABILITY

(75) Inventors: Jens Nilsson, Saltsjo-Boo (SE); Hakan Andersson, Sundbyberg (SE)

(73) Assignee: VIDEO B HOLDINGS LIMITED, Tortola (VG)

( * ) Notice: Subject to any disclaimer, the term of this patent is extended or adjusted under 35 U.S.C. 154(b) by 967 days.

(21) Appl. No.: 12/269,393

(22) Filed: Nov. 12, 2008

(65) Prior Publication Data
US 2009/0181775 A1  Jul. 16, 2009

Related U.S. Application Data

(63) Continuation of application No. PCT/SE2006/000559, filed on May 12, 2006.

(51) Int. Cl.
*G06F 15/16* (2006.01)
*G07F 17/32* (2006.01)
*G06F 11/14* (2006.01)
*G06F 11/20* (2006.01)

(52) U.S. Cl.
CPC ........ *G07F 17/3283* (2013.01); *G06F 11/1482* (2013.01); *G07F 17/32* (2013.01); *G07F 17/3223* (2013.01); *G06F 11/2038* (2013.01)

(58) Field of Classification Search
CPC .............. A63F 13/12; A63F 2300/407; A63F 2300/50; A63F 2300/51; A63F 2300/534; G07F 17/32; G07F 17/323
USPC ......................................................... 709/238
See application file for complete search history.

(56) References Cited

U.S. PATENT DOCUMENTS

| 6,175,869 | B1 * | 1/2001 | Ahuja et al. ................... 709/226 |
| 2004/0192432 | A1 * | 9/2004 | Walker et al. ................... 463/20 |
| 2004/0219967 | A1 * | 11/2004 | Giobbi et al. ................... 463/16 |
| 2007/0184903 | A1 * | 8/2007 | Liu et al. ......................... 463/42 |

FOREIGN PATENT DOCUMENTS

| EP | 1432209 A2 | 6/2004 |
| EP | 1480102 A2 | 11/2004 |
| GB | 2400199 A * | 10/2004 |
| WO | 0079391 A1 | 12/2000 |
| WO | WO 0079391 A1 * | 12/2000 |
| WO | 2005026909 A2 | 3/2005 |
| WO | 2005045551 A2 | 5/2005 |

OTHER PUBLICATIONS

International Search Report, PCT/SE2006/000559, mailed Feb. 7, 2007.

* cited by examiner

*Primary Examiner* — Ryan Jakovac
(74) *Attorney, Agent, or Firm* — Cantor Colburn LLP

(57) ABSTRACT

Managing failover and takeover of a game session in a computerized gaming system adapted for operating a plurality of client gaming machine terminals communicatively coupled to one of a plurality of game application servers, comprising: sending a request of a game session from a client gaming machine to a first game application server; determining in the client gaming machine non-responsiveness to the request; re-transmitting the request from the client gaming machine to a second game application server; constructing the game session state in the second game application server; processing the request in the second game application server; and sending a response dependent on the request from the game application server to the client gaming machine.

13 Claims, 6 Drawing Sheets

GAMING SYSTEM WITH FAILOVER AND TAKEOVER CAPABILITY

RELATED APPLICATION

This application claims priority to, and is a continuation of, International Application No. PCT/SE2006/000559, having an international filing date of May 12, 2006, which is hereby incorporated by reference herein in its entirety.

TECHNICAL FIELD

The present invention relates generally to the management of failover and takeover in a computerized game of chance operated via gaming machine terminals in a computerized gaming system. In particular, the present invention relates to a system that enables failover and takeover with the preservation of an on-going game session.

BACKGROUND

In computerized gaming, involving casino game or lottery game types, there is usually a bet and a possible winning prize payback at stake. A player may be about to win when interruption occurs and thus may be deprived of his winning play or his payout if the game is not resumed after the interruption. Gaming systems are usually also subject to strict control from authorities that require game record keeping for audit purposes, and it is not acceptable for game records to deviate from factual payouts. It is therefore important for the credibility of the gaming operator to manage interruption and game resumption in a secure and correct manner.

In computerized gaming systems where gaming machines, for example slot machines or poker machines, are connected to a game server there are for inter alia the above reasons high demands on the uptime and the operability of the system. The gaming system must be insensitive to interruptions in communications between the gaming machines and the game server.

Computerized gaming systems have traditionally been designed with a high level of local autonomy on the part of the gaming machine in relation to the game server. As a consequence, the possibility to rationalize the management of gaming system by means of common server resources has been utilized only to a small extent. There is a need for improving the efficiency of computerized gaming systems, and one way to do this is by increasing the usage of the server resources. Consequently there is a need for increasing the reliability and availability of these server resources.

RELATED ART

The present invention makes use of prior art disclosed in the co-pending but not yet published patent application no PCT/SE2005/001716 by the same applicant as the one for the present application. The content of PCT/SE2005/001716 is herewith incorporated by reference.

Further examples of prior art are found in the following patent publications.

WO 2005/026909 A2 claims to disclose a system and method for gaming system configuration and control in a gaming environment. Certain embodiments include receiving a request for an application to execute at a gaming system, and routing the request to an appropriate application server to provide the application at the gaming system. The request may be routed based on a status of a plurality of application servers, for example. The method may also include verifying that the gaming system is authorized to execute the application. In an embodiment, the method includes distributing a request for data among a plurality of database servers.

US 2004/0002385 A1 claims to disclose a gaming communication network with an enhanced DCU that provides redundant mediation between gaming machines on the gaming communication network and a host server. The enhanced DCU provides a first, primary transmission path and a second, redundant transmission path between the gaming machines and the host server. In the event one transmission path is disrupted, the other provides continuing transmissions between the gaming communication network and the host server. In the event both transmission paths are disrupted, the enhanced DCU functions as a local interim server and stores data received from the gaming machines on the gaming communication network until such time as the data can be transmitted to the host server. In some embodiments, the enhanced DCU acts as a local interim server to the gaming machines using data mirrored from the host server prior to transmission disruption. In some embodiments, the enhanced DCU functions as a download server, stores data received from the host server, and asynchronously transmits the data to the gaming machines, so as to mitigate disruption of game play. In some embodiments, the enhanced DCU may also function as a local cache of information that is repeatedly accessed by the gaming machines on the gaming communication network so as to reduce the transmission load on the first and/or second transmission path.

US 2005/0198335 A1 claims to disclose a method and system for distributing work load in a cluster of at least two service resources. Depending upon the configuration, a service resource may be an individual process, such as a single instance of a computer game, or a node on which multiple processes are executing, such as a Server. Initial connection requests from new clients are directed to a single entry-point service resource in the cluster, called an intake. A separate intake is designated for each type of service provided by the cluster. The clients are processed in a group at the service resource currently designated as the intake to which clients initially connected, for the duration of the session. Based upon its loading, the current intake service resource determines that another service resource in the cluster should become a new intake for subsequent connection requests received from new clients. Selection of another service resource to become the new intake is based on the current work load of each resource in the cluster. All resources in the cluster are periodically informed of the resource for each service being provided that was last designated as the intake, and of the current load on each resource in the cluster. Subsequently, new clients requesting a service are directed to the newly designated intake for that service and processed on that resource for the duration of the session by those clients.

JP2002055904 claims to disclose a game contents providing server that seeks to enable the playing of a game continuously even if a connection is cut off carelessly. A game contents providing server 1 is connected to a computer network 5 composed of computer terminals 3 connected together in a communicable state. The server provides registered game contents so that access users can play the game and is equipped with a game state registering means 15 which obtains information specifying an access user and registers game state data of a game in case of disconnection. If the access user is disconnected during the game and the access user gains access again, then the game state is distributed to the computer terminal 3 of the access user according to the registered game state data so that the user can carry on the game.

WO02098526 A1 claims to disclose an apparatus and method for distributing a multi-client system (10) over a communications network (40) for use in games and other applications. The system (10) includes a plurality of servers 14, 16, 18) each associated with one or more clients (32,34, 36,38). A set of data (102,112, 122) is maintained on each server for each client/object, and an interaction data set for each non-associated client/object (clients/objects on another server) (104,106,114,124,26) is transmitted to other servers to provide inter-server mirroring or duplication of data. The interaction data set is a subset of the set of data for each client/object. Volumes, each defined by a set of coordinates, managed by each server (204) are dynamically allocated to manage server load based upon the number of clients/users associated with the volumes.

US 20040219967 A1 claims to disclose a method to pause a game played via a first gaming machine and resuming the game via the same gaming machine or via another, second gaming machine. The status of a paused game is stored at a central database linked to the gaming machines and is associated with a personal identifier of the player. To continue a paused game, the game play is continued by retrieving the game status from the central database in response to the input of the associated personal identifier via the same or another gaming machine.

These pieces of prior art show varieties of technical solutions related to the handling of interruptions in the communication between a gaming machine and a game server.

OBJECT OF THE INVENTION

It is an object of the present invention to provide a system for the management of failover and takeover in a computerized gaming system. In particular it is an object to provide such a system that enables failover and takeover with the preservation of an on-going game session of a computerized game of chance operated in a computer based gaming system with computerized gaming machine terminals that are connected to a remote central game server.

SUMMARY OF THE INVENTION

In accordance with the invention the object is achieved by providing a plurality of redundant game application servers that are communicatively couplable to client gaming machines for operating a game session by means of a client game module and a server game module. The game application servers are redundant in the sense that they are devised such that any of them is capable to be coupled to a client gaming machine and operate the applicable game session. During an on-going game session the client gaming machine sends requests to a coupled game application server and receives responses from the game application server, and matching states are created on the client side and the server side respectively. In the course of the game session, game session data is stored in a game server database. If there is an interruption and thus a failure in the capability or possibility to receive such a response in the gaming machine, the operation of the server part of the game session is moved to a different game application server. This is achieved by, in response to detecting that no response will be received from the first game application server, directing the communication from the client gaming machine to an available second game application server and reconstructing the game session in the second game server. For the purpose of game session reconstruction the stored game session data associated with the current game session and identified with a game session identification code comprised in the communication from the client gaming machine is retrieved from the game server database. The game session, or at least the server part of the game session, is re-executed and thus reconstructed up to the point of interruption, i.e. to the last and un-responded request. The second game application server generates a response to this request, in the same context and with the same input data as for the original request that was un-responded by the first game application server, and from thereon the operating of the game session continues with a different paired couple of a client gaming machine and a game application server. This failover-takeover procedure thus manages the failure in response from a first game application server during an on-going game session and the takeover of the server part of the game session operating by a second game application server. The failover-takeover procedure is preferably executed in a manner that is invisible to the player of the game session. The time delay is normally in the range of fragments of seconds and the player usually never notices any interruption. The interruption may for example be due to communication failure between the client gaming machine and a game application server or between a game application server and a game server database, as well as functional failure of the game application server or the game server database coupled to it. A technical effect of this is that any kind of interruption or failure in the operation on the server side, the game application server as well as the game server database, is managed without interrupting the game session as experienced by the player or by the operator. A further technical effect is that the game developers do not have to address these interruption cases when developing the game software.

According to an aspect of the invention the failover-takeover capability is utilized for introducing or taking down a game application server or a game server database during operation of the gaming system. The technical effect of this is that it renders scalability and serviceability to the system during 24 hours, 7 days a week (24×7) operation. Seamless removal of game application servers or game server databases for maintenance or upgrading as well as addition of game application servers whenever needed thus is enabled by the present invention.

According to another aspect of the invention there is enabled managing of redundancy of server side functions in the gaming system during 24×7 operation. Game application servers or game server databases are thus enabled to take over sessions from application servers or game server databases that have gone out of order or lost network communication connections without any need for players or client gaming machines to take any particular action.

According to a further aspect of the invention there is enabled load balancing in a high load operational environment of the gaining system during 24×7 operation.

Other aspects and advantages of the invention are described in the below description. The invention is preferably realized as a method, a system and a computer program product.

BRIEF DESCRIPTION OF ACCOMPANYING DRAWINGS

The inventive concept is further explained by means of examples and in conjunction with the accompanying drawings, in which:

FIGS. 1A and 1B show schematically embodiments of client-server based gaming system with failover-takeover capability according to an embodiment of the invention.

FIG. 1 C shows a schematic outline of the functions in a client-server based gaming system according to an embodiment of the invention.

DETAILED DESCRIPTION OF EMBODIMENTS OF THE INVENTION

The figures illustrate the configuration of a gaming system as well as a method and a computer program product for managing failover and takeover in accordance with the invention. The described method steps and functions are realized by means of computer system components, computer software code portions, or by means of combinations thereof. It is within the knowledge of the skilled person to select appropriate means and combination of means for the realization of the invention.

Preferred Embodiment of Gaining System with Failover and Takeover Capability

Figure 1A:
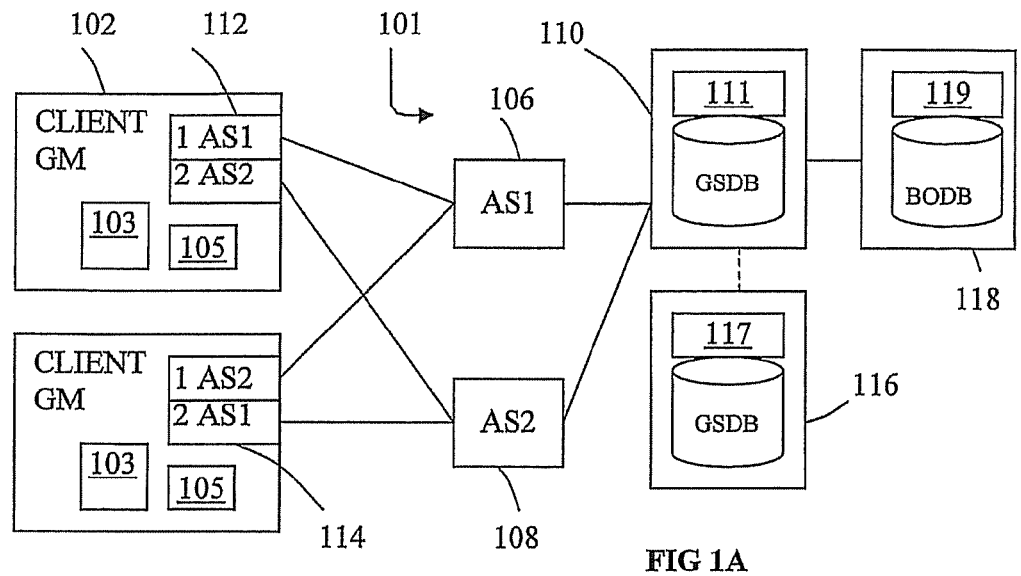

FIG. 1A shows schematically an exemplifying embodiment of a client/server based gaming system 101 with failover and takeover capability in accordance with the invention. A first client gaming machine 102 is communicatively coupled to a first game application server AS1 106 and to a second game application server AS2 108. The first and second game application servers are in their turn communicatively coupled to a game server database 110 comprising a database application logic layer 111 and a database storage structure GSDB. Communicatively coupled in this text means that there is provided a communication link over which information signals can be communicated between two coupled units, for example in the form of messages or data streams. The communication link can for example be continuously activated in an on-line state or be activated on request when a message, e.g. in the shape of a request or a response, is communicated. In a simple form the gaming system in accordance with the invention comprises a single client gaming machine, at least two game application servers and a game server database.

The gaming system according to the present invention is based on a client/server architecture where the game software is divided into a client game module and a server game module with access to a central database. In order to run a game the client game module must be associated with and use functions available at a server game module. When a game is played via a client gaming machine, a game session is established and game session data is generated in the course of the game. Each game session has a specific identity and is assigned a game session identity code. The game session data is stored in the game server database associated with the game session identity code and in some embodiments also with a reconnect identity code. The game session data comprises all the data that is necessary to reconstruct a game session as a whole or up to a certain point with the same result, outcome and output as the original game session. The operation of this specific kind of client/server gaming system and the game session reconstruction solution is explained in more detail below.

In the example of FIG. 1A there is also a second client gaming machine 104 that similarly is communicatively coupled to the first and second game application servers. The client gaming machines 102 and 104 are provided with means 112 and 114, respectively, for selecting one game application server to communicate with according to predetermined rules of priority and for directing the communication according to these rules. The client gaming machines 102, 104 are further provided with a mechanism 103 devised to determine dependent on predetermined receiving capability rules whether a response is capable of being or possible to be received from the game application server within a predetermined receiving condition. The receiving condition is one embodiment receipt within a selectable predetermined amount of time. In this case the predetermined amount of time can be coordinated with a normal function of timeout of predetermined accepted response time, for example such that the time of the receiving condition is shorter than the accepted response time that is configured for the client gaming machine so that the game session can be preserved on the client side during the operation time for the failover and takeover operations.

In another embodiment the receiving condition is a predetermined dependency on a status parameter, for example a parameter that describes the status of the communication link, the game server, some other functionality or control parameter of the gaming system. In a further embodiment, the receiving condition is dependent on a predetermined quality of response from the game application server, for example the response may be erroneous or inconsistent with the request, or may communicate a request from the server side to trigger a takeover by a different game application server for example due to maintenance. The request to trigger a takeover may also have the form of a switch off signal or a command to a game application server or a game server database, and is an optional feature in an embodiment of the invention.

The client gaming machines 102, 104 further preferably comprises means 105 devised to initiate re-transmit of a request in response to negative receiving capability being determined, and to initiate selecting and re-directing to a different game application server.

The direction priority rules are used to establish communication of the client gaming machine with the game application server that has the highest priority. If such communication fails, the client gaming machine tries to communicate with the game application server that has the next level of priority and so. In this example the first client gaming machine 102 is adapted to communicate with the first game application server 106 with first priority and with the second game application server 108 with second priority. Conversely, the second client gaming machine 104 is adapted to communicate with the second game application server 108 with first priority and with the first game application server 106 with second priority. In this manner the client gaming machines have alternative game application servers to communicate with in case the communication path or the first selected game application server for some reason are inoperative for the purpose of the client gaming machine.

The game application servers 106, 108 are coupled to a game server database 110, which may be a common game server database 110 as shown in FIG. 1A or separate game server databases. However, in a system with failover and takeover capability there is provided at least one reserve game server database 116, comprising a database application logical layer 117 and a game server database storage structure GSDB, adapted to be switched into communicative coupling with the game application servers to substitute a first game server database for example in case of operational failure or when it is intentionally taken out of operation. The game server database 110,117 is further communicatively coupled to a back office database 118, similarly comprising a database application logic layer 119 and a database storage structure BODB.

Figure 1B:
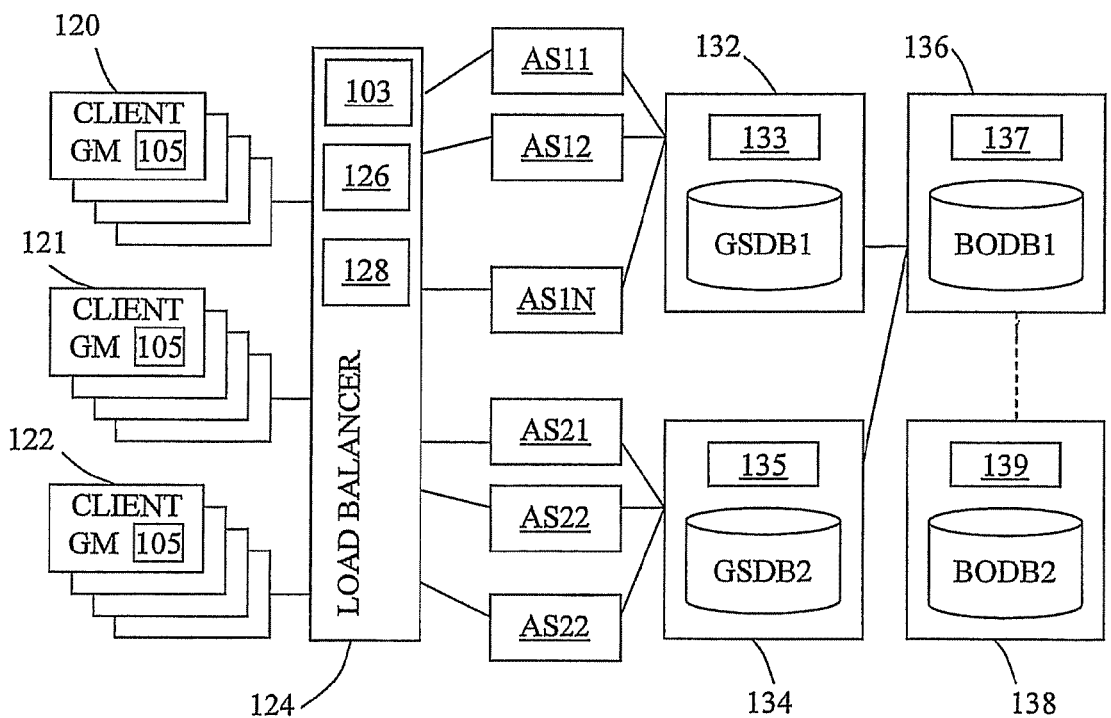

FIG. 1B shows an embodiment of a client/server based gaming system with groups of client gaming machines 120, 121, 122 communicatively coupled to a load balancer 124. The load balancer is in its turn communicatively coupled to a plurality of game application servers. A first group of game application servers AS13, AS12 . . . AS1N are communicatively coupled to a first game server database 132 with database application logic layer 133 and a database storage structure GSDB1, and a second group of game application servers AS21, AS22 . . . AS2N are coupled to a second game server database 134 with a database application logic layer 135 and a database storage structure GSDB2. The first and second game server databases 132,134 are in their turn communicatively coupled to a single back office database 136 comprising a database application logic layer 137 and a database storage structure BODB1. The coupling to the back office database is a single entry point and functional redundancy is achieved by providing a second back office database 138 with a database application logic layer 139 and a database storage structure BODB2 to which the single entry point coupling can be switched in case the first back office database BODB1 is out of order or is taken out of operation.

The information stored in the game server database has a transactional nature and inter alia comprises information pertaining to game sessions, game session data, game session identity, client gaming machine identity, etc as the game sessions are operated and executed. This information is preferably cashed, i.e. temporarily stored, in the game server database and is continuously or intermittently transmitted and stored in the back office database, and then deleted from the game server databases. The back office database is thus used to store selections of historical data from the transactions, possibly in a different format than in the game application server.

In the shown embodiment the mechanism 103 for determining the capability of receiving in the gaming machine a response to the request from the first game application server within a predetermined receiving condition is optionally provided in the load balancer 124. The load balancer also comprises means 126 for selecting a game application server for the client gaming machines to communicate with according to predetermined priority rules, and means 128 for directing the communication to and thus to establish communicative coupling with a selected game application server. Normally, a specific client gaming machines would always be directed to the same game application server. But as described above, the means 105 for initiating re-transmit, selecting and re-directing comprised in the client machines 120,121,122 is activated in response to negative receiving capability being determined, and initiate selecting and re-directing a re-transmitted request to a different game application server.

So for example, in one embodiment the priority rules are devised to couple a gaming machine from the first group of client gaming machines 120 to a game application server from the first group of game application servers AS11, AS12 . . . AS1N with a first priority and to a game application server in the second group of game application servers AS21, AS22 . . . AS2N with a second priority, and similarly for the different groups of client gaming machines and game application servers. The selection of game application server within or between the groups is also controlled by means of the priority rules according to any suitable predetermined scheme known in the art, for example, dependent on processing load, number of active game sessions, a round robin scheme, a randomized selection or plain availability for communication.

In an exemplifying simple case of failover-takeover management when a game session is about to be established and a client gaming machine seeks communicative contact with a game application server, the client gaming machine sends a request to the game application server and awaits a response. The receiving capability mechanism determines whether a response is capable of being or possible to be received from the game application server within the current predetermined receiving capability condition, for example within a predetermined amount of time. If it is detected that the response from the first contacted game application server will not be received by the client gaming machine within, in this example, the predetermined time, the communication is directed to the second game application server in accordance with the predetermined rules of priority and the request is sent anew to the second game application server. In this initial communication phase before a game session has been established, the failover-takeover function is thus realised by making contact with and using an alternative game application server for the game session.

In the case when a game session is established and executed the failover-takeover function is more complex. The procedure for failover and an inherent takeover function comprises in one embodiment a selection of the following steps.

1. A client gaming machine is thus operating a game session that is associated with a game session identity code via said client gaming machine and a first game application server.

2. As the game session is operated and executed, game session data of said game session is stored in the game server database associated with the game session identity code. Selected information about the game session is preferably also stored in a back office database.

3. In the course of operating the game session, requests are communicated from the gaming machine to said first game application server.

4. For each request it is determined the capability of receiving in the gaming machine a response to the request from the first game application server within a predetermined receiving condition.

5. If the capability of receiving a response from the first game application server is determined not to be fulfilled within said predetermined receiving condition, then measures are taken according to the following steps. If on the other hand the capability of receiving the response is fulfilled within the predetermined receiving condition, then the operating of the game session continues in a normal manner.

6. The client gaming machine is in one embodiment devised to re-send its last request to the first game application server for a predetermined number of times or during a predetermined amount of time, in response to determining said lack of receiving capability. This preserves the original coupling between the client gaming machine and the first game application server, and the game application server handle re-transmits by cashing the last generated response and resend the response if it corresponds to the re-sent request. This can be implemented as a level of the predetermined receiving conditions.

7. A second game application server for operating the server part of the game session is selected dependent on predetermined priority rules.

8. The client gaming machine is communicatively coupled to the selected second game server.

9. A request associated with the game session and comprising said game session identity code is communicated from the gaming machine to said second game server.

10. The second game application server receives the request from the client gaming machine, possibly together with failover status indicator data, and determines that it does not currently operate the game session related to this request.

11. The second game application server communicates a request to the logic layer of its related game server database (second game server database) and requests information about the game session that is associated with the game session identity code. The requested information is for example the identity of the first client gaming machine.

12. If the first game application server was related to a different game server database (first game server database), then the second database communicates with the first database and requests the information about said game session. In order to find the identity of the first game server database, the second game application server may request this information from the back office database if applicable.

13. Dependent on the thus requested information about the game session, it is determined by one of the game server database or by the second game application server whether a takeover of the game session from the first game application server is possible. For example, it is not possible to take over a game session if there is some on-going processing related to a request in the original game application server or game server database. This makes sure that the same request, pertaining to the same game session, is not processed or operated simultaneously by two game application servers or game server databases.

14. If takeover is determined to be possible, then the game session is taken over, if applicable, by the second database from the first database without involving the second game application server and then taken over by the game application server. Alternatively, if only one game server database is involved, the game session is taken over directly by the second game application server.

15. If the first game application server is communicatively capable, e.g. being in an online state, then one of said game server databases sends a notification that the game session has been taken over by a second game application server. The game application servers are devised to remove any cached data for such a taken over game session in response to such a notification in order to avoid working on stale data.

16. The game session data that is stored associated with said game session identity code is retrieved from the game server database by the second game application server.

17. The game session is reconstructed by means of the retrieved game session data. In a preferred embodiment, only the server side of the game session is reconstructed and the client side of the game session remains intact. The reconstruction of the game session is carried out by means of functions for reconnect handling described in more detail below.

18. The operating of the game session is continued via said client gaming machine and said second game application server.

General Setting of Client/Server Gaming System

Figure 1C:
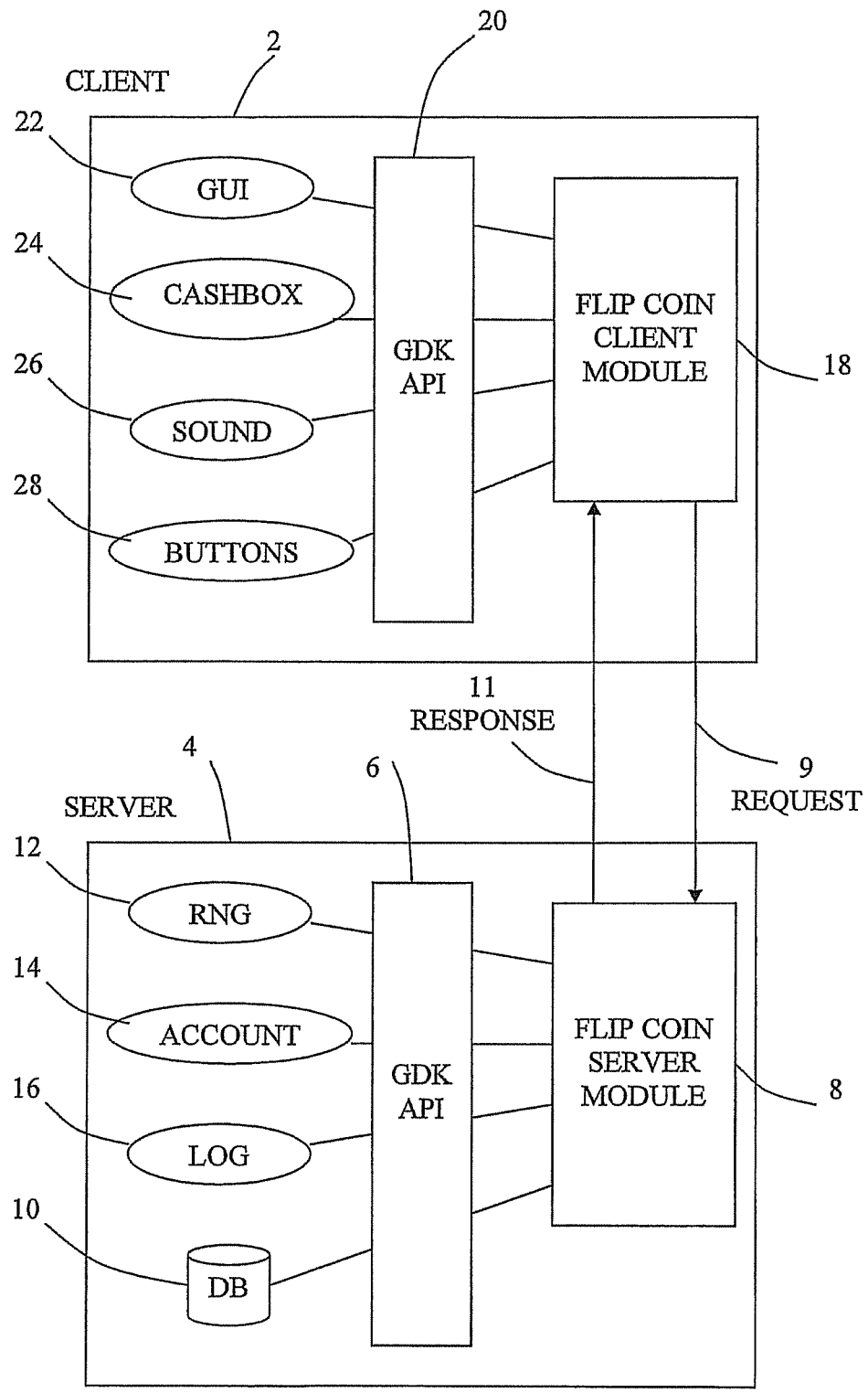

FIG. 1C shows schematically a client and server based computerized gaming system with a gaming machine 2, herein also called a video lottery terminal, set up as a client gaming machine 2 and a game application server 4 that are communicatively coupled. The gaming machine 2 and the game application server 4 are provided with data processors, memory means, data communications interfaces, control programs, user input/output interfaces etc. in a per se well known manner. Different functions and features that are specific for the present invention are preferably realised by means of software computer program code executed on the server and the client respectively, by means of specifically designed electronic components or by means of combinations of software and electronic components. In the example of FIG. 1C there is only a single client gaming machine but of course a number of client gaming machines can be and are normally connected to a server as shown in FIG. 1A.

The server 4 is provided with a game application program interface (server game API) 6 enabling communication between a server module of a specific game application program 8 and general server gaming functions 10,12,14,16 installed on the server. The general server gaming functions are provided to be available for any specific game application program independently of the specific game content. These general server gaming functions are typically critical functions such as a database 10, a random number generator 12, an account service function 14, a log service function 16, or other functions that beneficially are shared and used by different specific game application programs. In different configurations of the invention, the mentioned general server functions may be integrated with the server or be configured as separate entities that are communicatively coupled to the server. For example, the game server database is in preferred embodiments a separate entity provided with a logical database application layer.

The client gaming machine 2 is also provided with a game application program interface (client game API) 20 enabling communication between a client game module 18 of the specific game application program and general client gaming functions 22,24,26,28 installed on the client gaming machine 2 and used by different client game modules. The general client gaming functions are designed for assisting in implementing and executing a specific game on the client gaming machine 2 and are available for the client game module 18. These general client gaming functions are in different embodiments a selection of a graphical user interface GUI 22, a cashbox function 24, a sound function 26, user input interface function, for example buttons, 28, data storage 29, a printer 3, a bar code reader 33 and other functions that are related to the performance of a game. The client game module 18 is communicatively coupled to the corresponding server game module 8 for communicating requests 9 and responses 11 in order to utilize the general gaming functions provided in the server. For each game a message protocol for communication between the client module and the server module is generated, the protocol is for example based on XML and is shared by the client and the server.

Figure 3:
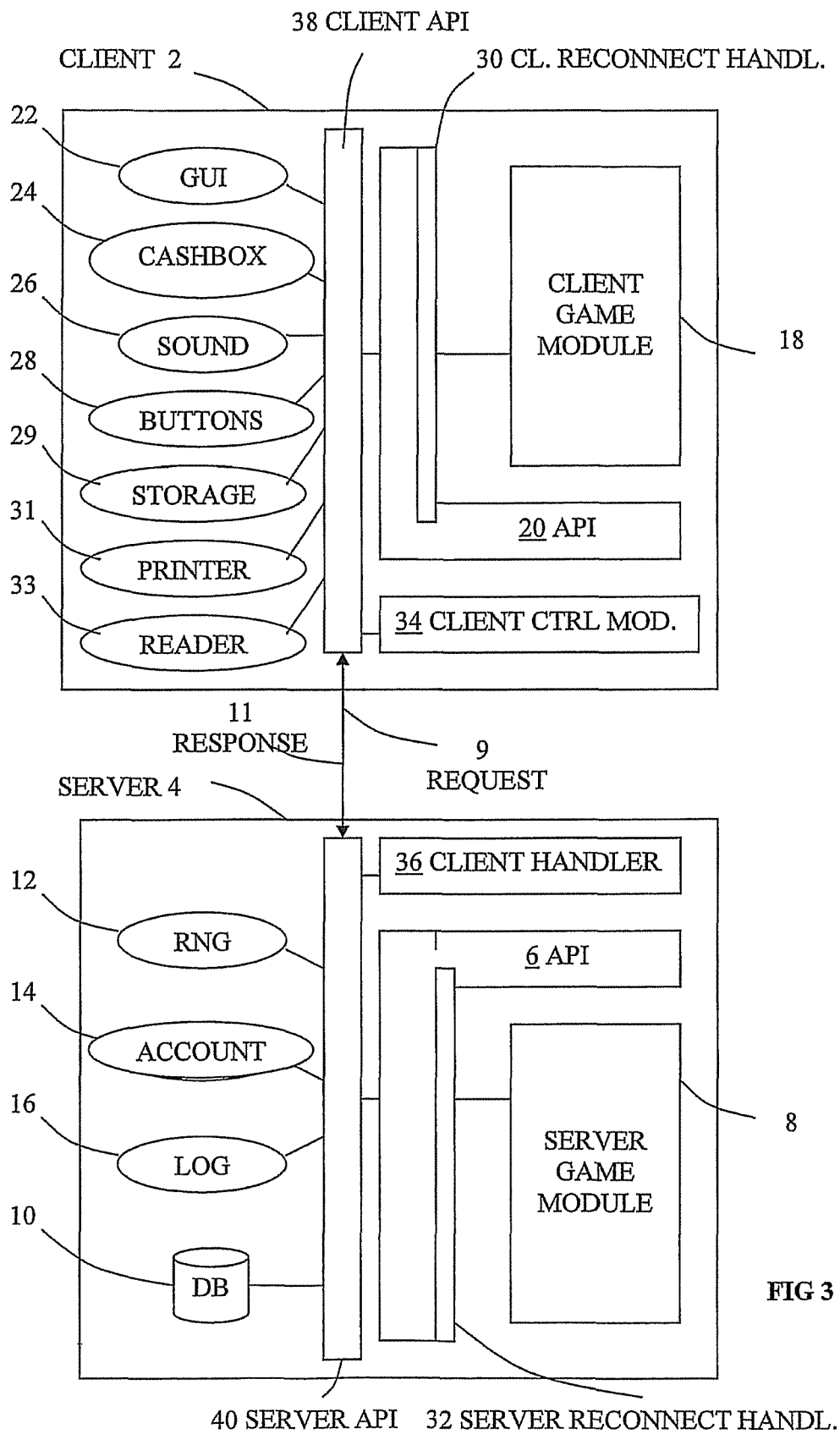
FIG. 3 shows a variety of the gaming system in accordance with embodiments of the invention.

A specific game application program in accordance with the invention thus comprises a server game module 8 and a client game module 18 that communicate either directly or via an application program interface on the client side and the server side respectively as shown in FIG. 1C and FIG. 3. The client game module 18 uses a selection of general client gaming functions that are available in the client gaming machine, whereas the server module 8 uses a selection of general server gaming functions 10,12,14,16 that are commonly used by different game applications and that are provided and available centrally in the server 4.

FIG. 3 shows a more detailed view of the configuration of a client and a server in a gaming system in accordance with an embodiment of the invention and similar to that of FIG. 1. In the game application server 4 the server game module 8 is embedded behind an application program interface called server game API 6 through which all communication of the server game module 8 takes place. The game application server 4 further comprises a server application program interface in short called server API 40 through which all communication with the general server gaming functions 10,12,14, 16 from the part of the server game API 6 as well as from the part of other server functions and external communication takes place. The server 4 is further provided with a reconnect handler 32 that in a preferred embodiment is integrated with the server game API 6. The game application server 4 is provided with further server function modules, in the exemplifying embodiment more specifically comprising a client handler 36 that is communicatively coupled to the server API 40. The client handler 36 manages, i.e. inter alia comprising handling and serving, communications and functions of the client 2 other than the specific game applications. As illustrated in the drawing with a double arrow, communications with the client gaming machine 2 takes place via the server API 40 and a similar client API 38 provided in the client gaming machine 2. In the same manner as described above, the communication with the general client gaming functions is carried out via the client API 38. The client gaming machine 2 comprises a client control module 34 that controls communications and general functions of the client gaming machine other than the specific game applications and communicates via the client API 38. In the gaming client 2 the client game module 18 is, similar to the configuration of the server, embedded behind an application program interface called client game API 20 through which all communication of the client game module 18 takes place. The client 2 is further provided with a reconnect handler 30 that in a preferred embodiment is integrated with the client game API 6.

Figure 2:
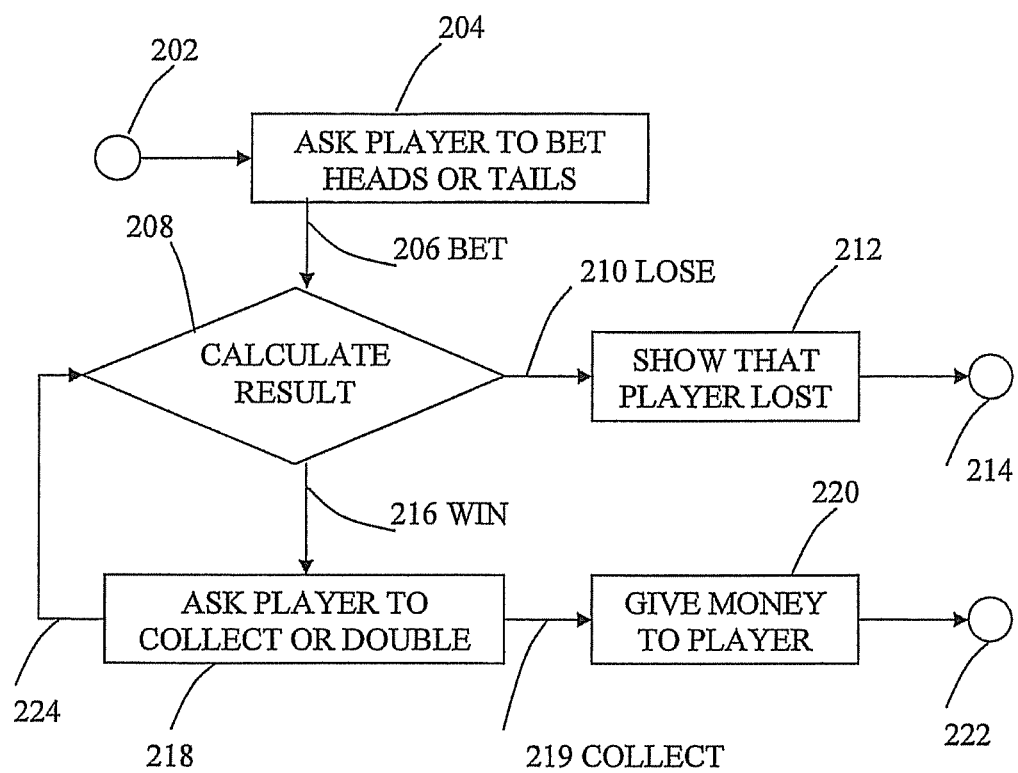
FIG. 2 shows a flow chart of a simple example of a gaming application.

FIG. 2 shows schematically a simple example of a portion of a gaming application in accordance with the invention, more particularly a flip coin game of chance. The game is run by executing the client game module 18 and the general client gaming functions of the flip coin gaming application in a client gaming machine in step 202. In step 204 the player is presented a message asking the player to bet on heads or tails. The player places a bet 206 and a result is calculated in 208. Step 208 involves the client game module 18 sending a request to the server game module 8 to generate an outcome of the game. The server game module in its turn calls the random number generator 12 and receives a random number in return. The server game module calculates an outcome according to predetermined rules for the game and dependent on the returned random number. Thereafter, a response with the outcome Win or Lose is communicated back to the client game module. If the outcome is Lose 210 the player is presented a message showing that player lost 212, and the game is ended in 214. If, on the other hand the outcome is Win 216 the player is presented a message asking player to collect the prize or double a bet again 218. If the player inputs a request to Double 224, a new result is calculated in 208 in the above manner. If on the other hand the player inputs a request to Collect 219, the prize, usually in the form of cash or credit money, is paid to the player and the game ends in 222. The payout of a prize again preferably involves requesting services from the server game module and for example utilizing the general server gaming functions account function 16 and database function 10.

Preferred Embodiment of Interruption and Reconnect Management

In accordance with the inventive concept, interruption or abnormal termination of a player session during playing a game is handled by means of mechanism for reconstruction of a game session herein also called a reconnect function. The reconnect function is managed by storing the previous game configuration in the server database at the beginning of each game round. All user interactions and inputs that occur during the game round as well as the random numbers that were generated are stored in the server database associated with a game session identity code. When a player session or a game session is terminated abnormally a reconnect voucher is created by the client gaming machine and output to the user. The voucher comprises account balance information and a reconnect identity code, that is coupled with or identical to the game session identity code and that is used to identify the interrupted game. The player can thereafter request a reconnect by inputting the voucher to the same or another gaming machine. The game is initialised with the game session properties that were stored at the beginning of the round and retrieved from the database by means of the voucher identity code, and the interrupted game session is reconstructed up to the point of interruption. Thus the reconnect function enables the player to continue the game at the same stage as when interrupted.

In connection with the failover-takeover procedure, the mechanism for reconstruction of a game session is applied in the background of the system and is preferably invisible to the player. For example no reconnect voucher is issued. In the voucher case, reconnect and game session reconstruction is initiated by the client gaming machine in response to a received voucher. In the failover and takeover case, the game session reconstruction and reconnect is initiated from the second game application server that is contacted and receives a redirected request belonging to an on-going game session. If the failover and takeover procedure for some reason fails, the game sessions is interrupted also in the client gaming machine and a reconnect voucher is issued. The failover-takeover procedure utilizes a selection of the steps, functions and means described herein in the context of reconnect of a fully interrupted game session however suitably adapted to the failover-takeover requirements. It should be understood that features of the failover-takeover embodiment are combined with selected features of the reconnect embodiments.

Figure 4:
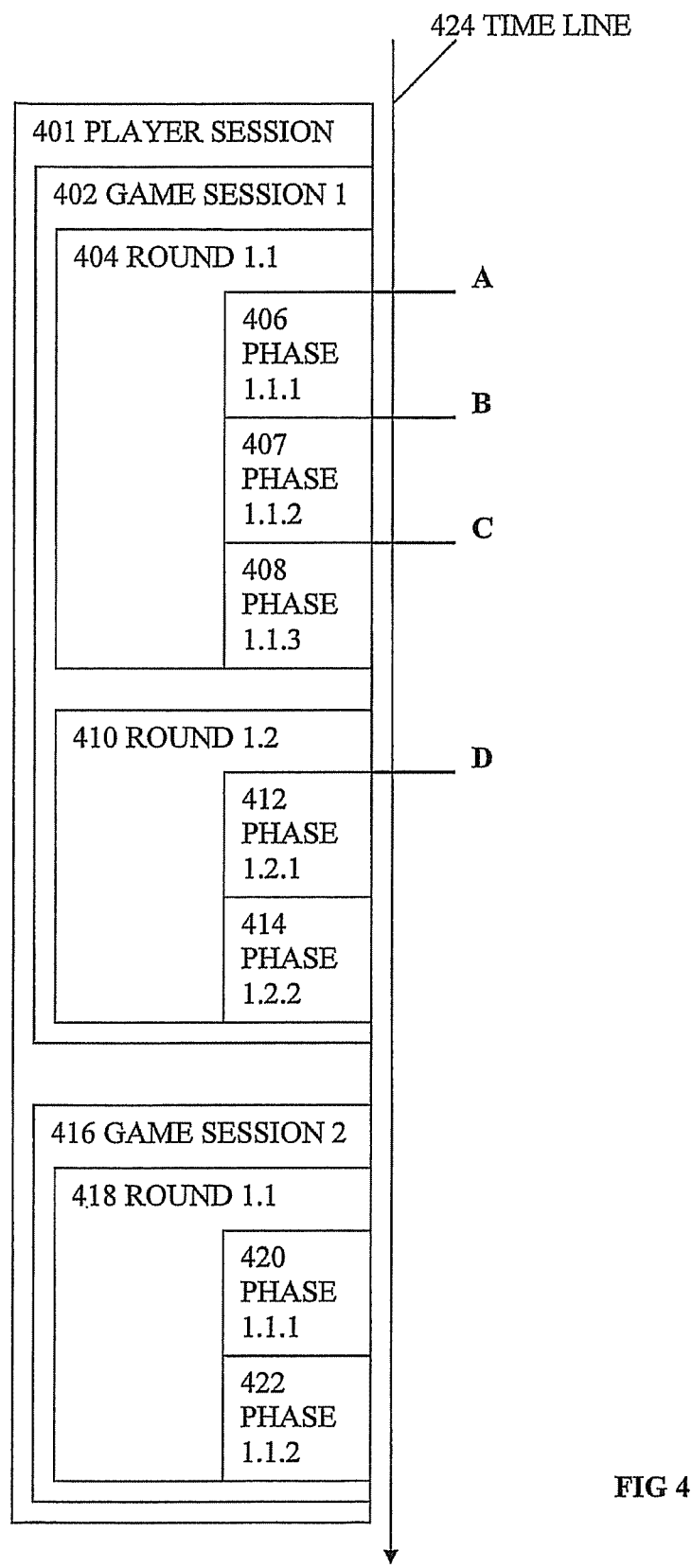
FIG. 4 shows a schematic view of different phases of a game.

FIG. 4 illustrates schematically an example of the lifecycle of a game in drawn in relation to a timeline 424. A player session 401 is initiated by a player by inputting start commands via a user interface of the gaming machine. The player initiates a game and inputs a bet in terms of a monetary value by means of some kind of payment method such as coins or an account transaction and thereby starts a first game session 402. The game session progresses in discrete steps herein called game rounds and exemplified with a first round 404 and a second round 410. Each round in turn progresses in discrete steps called game phases. So for example, round 404 comprises three game phases 406,407 and 408. The transition between game phases is driven by game round events which in different embodiments may have different content and different triggering mechanisms.

A game round event is triggered by an input that starts the generation of a set of associated elements of critical game session data that defines a game result preferably comprising the current bet value, a current generated random number and a current win value. The game round event would usually be triggered by a player making an input through an I/O interface such as a push button that conveys game commands like "Deal cards!" in a poker game.

In a simple example the game session data that defines a game result is generated in a gaming machine. The game round event is triggered whereupon the generation of this set of game session data is executed and the data set is completed. A confirmation of successful storage is generated, a presentation of the game result is output to the player and the game phase is ended. In the client-server architecture described above, the client game module contacts the server game module with a request in response to the triggering of a game round event. The server game module executes the request and creates game result defining game session data for the current game phase. This data is stored in the server database and a response comprising the game result defining data is transmitted to the client whereupon a presentation of the game result is output to the player and the game phase is ended. The presentation of the game result to the player typically comprises updating a screen display of the gaming machine.

At the beginning of each game phase, in FIG. 4 illustrated with time indicators A, B, C, D, the gaming machine, e.g. the client game module, is set in a waiting mode waiting for input from the player. When a game round event is triggered by the player, the client game module and the server game module executes the game rules, moves the game process to the beginning of the next phase, stops and again goes into the waiting mode to wait for player input. From a gaming system macro perspective the execution of a game progresses in discrete steps where the game phases are the smallest units of execution. An interruption is defined as the event that the gaming machine looses contact with the remote data storage, or as the case may be in a client-server gaming system with the server, for a predetermined amount of time during a game session. The interruption can occur at any point in time and may be intentional or unintentional as a result of a player action, a system operation action or due to gaming machine failure, data communications failure or other system failure.

Figure 5:
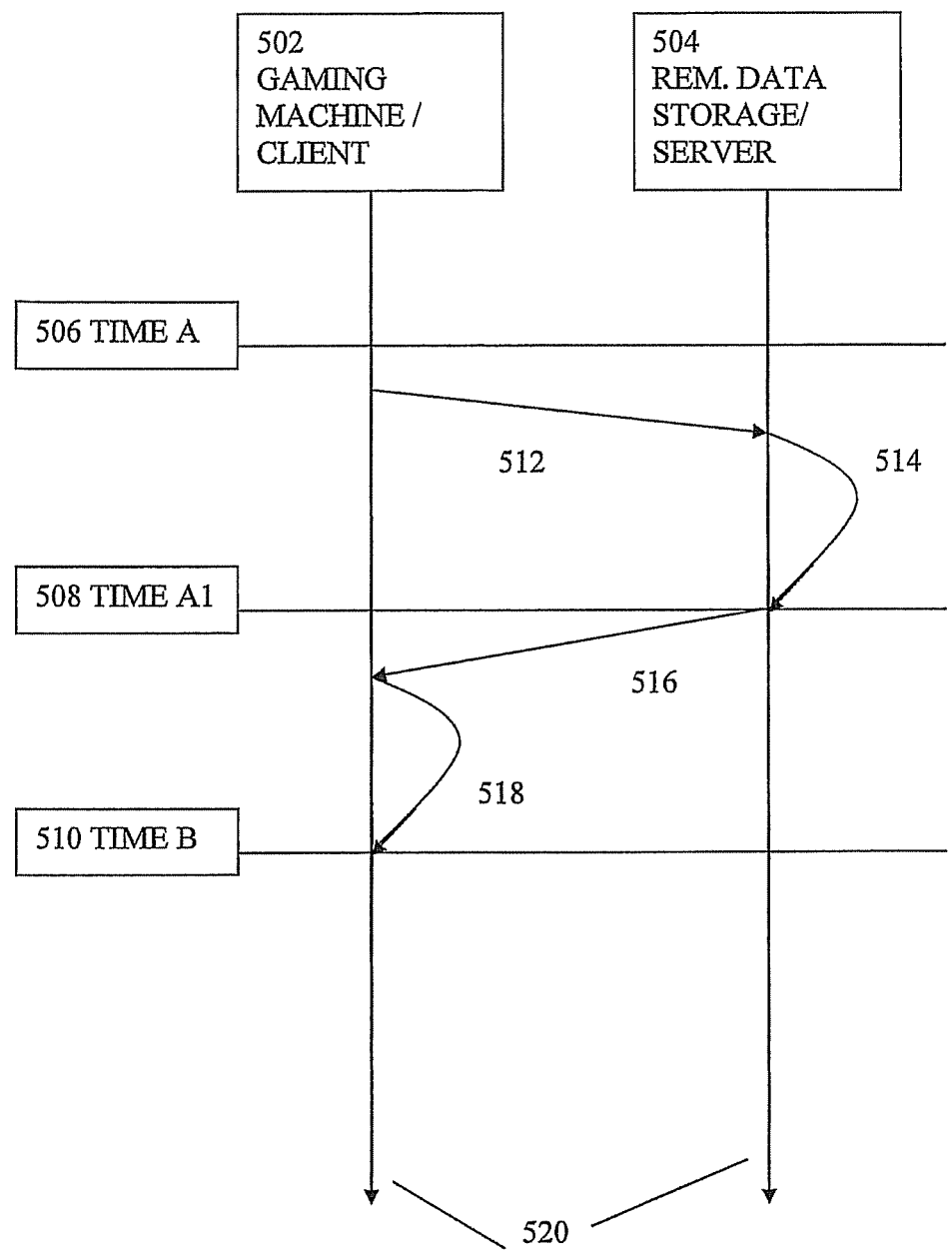
FIG. 5 shows a schematic sequence diagram that illustrates communications between a gaming machine/client game module and a remote data storage/server game module.

FIG. 5 shows a schematic sequence diagram that illustrates communications between a gaming machine/client game module 502 and a remote data storage/server game module 504, as well as executed steps occurring during a game phase depicted in relation to time lines 520. The current game phase starts at 506 Time A and a waiting mode is entered and lasts until there is a game round event 512 comprising transmitting a request 512 from the gaming machine/client game module 502. The request is received at the remote data storage/server game module 504 whereupon in step 514 the request is executed and resulting game session data is stored in a database residing in the data storage. In the simpler embodiment not involving a client-server configuration, a procedure call to generate the game result defining data would correspond to the request. The execute and storage step 514 is completed at 508 Time A1 and thereafter in step 516 a response comprising resulting game session data is transmitted from the remote data storage/server game module 504 to the gaming machine/client game module 502. After receipt of the response the gaming machine/client game module 502 presents an output, e.g. an animation of a game outcome via the display screen dependent on the result of the execution in the game round event, which is terminated at 510 Time B with a transition into the next game phase. The execution and storage step 514 is treated to be atomic in the sense that either it is completed or it is entirely failed. A game phase is considered to be complete when the execution and storage step 514 has been completed, i.e. at 508 Time A1, whether or not the following steps 516, 518 up to 510 Time B have been completed when an interruption occurs.

In the failover-takeover solution the game session is still valid in the client gaming machine, and necessary identifications are preferably comprised in the request messages or is retrieved from the game application database or the back office database with information comprised in the request as a key. However, if the player session is fully interrupted the right of the player must be proven. The problem of proving the right of a player to a certain interrupted game session is in one embodiment handled by issuing a reconnect voucher when a game session is interrupted. Each new player session is given a reconnect identity code when it is initiated and, as previously mentioned, the stored nondeterministic inputs and execution results and outcomes make up game session data that are associated with the reconnect identity code. The reconnect identity code is preferably stored locally in the client gaming machine as well as in the server. When a game session is interrupted the client gaming machine prints out a reconnect voucher with indicia that represent the game session identification code. This reconnect voucher is a value token representing the right of a player to the interrupted game session and is also the key for identifying and retrieving the stored game session data. A game session is reconnected and resumed by inputting the indicia via a reconnect voucher interface provided on the client gaming machine. For the case that the client gaming machine is incapable of printing out a reconnect voucher, for example due to a hardware or software breakdown, the invention provides for the possibility to print out a reconnect voucher on a separate gaming administration machine connected to the gaming system. In this case the proper reconnect identity code is found in the server database by means of the client identification and point in time for the interruption. The indicia are in one embodiment printed and read in a bar code format, but other indicia formats are of course conceivable. The printed reconnect voucher is useful when the players are anonymous. In other embodiments where the identity of the player is known, for example using player card or player accounts it is convenient to store the reconnect identity code associated to the player together with account information in a database or on a writable data storage means on a player card.

Embodiments of Interruption and Failover-Takeover Management

The invention is thus applied in a computerized gaming system adapted for operating a plurality of client gaming machine terminals communicatively coupled to a game application server. In a typical situation a number of gaming machine terminals are operatively coupled to and communicates with the game application server, new gaming machine terminals of different technical platforms log onto and log off from the server as player sessions and game sessions are started and terminated from each respective gaming machine terminal.

In a typical case in which the invention is employed a player has started the initiation of a player session for a first gaming machine terminal, for example an interactive video terminal gaming machine at a casino venue. The player continues by starting the initiation of a game session via this first gaming machine terminal in communication with the game application server and the game session is given an identification code called a game session identification code. Game session data including game session identity information is stored in the server database together with gaming machine identity, thereby coupling said first gaming machine terminal to said game session. The step of initiating a game session for a gaming machine would normally comprise the player entering a player command via the input/output interface of the client gaming machine terminal for example by selecting a specific game presented on a game selection menu on the display screen. The selected client game module and corresponding server game module is started involving communication via the client API and the server API.

The communications between the gaming machine terminal and the game application server as well as steps that are performed for realizing the invention are described in the following exemplifying embodiment based on the client-server configuration. Reference is made to the figures. The numbered list below is merely for reference purpose and does not necessarily mean that the steps are performed in a sequence corresponding to the indicated numerical order.

1. A player initiates a player session 401 on the client gaming machine 2 by inputting a start command to the client game module 18 via an I/O-interface (22,24,28) which may be a traditional button or a button field on a touch screen. The initiation of a player session would preferably also comprise a monetary transaction for bets in the game, for example by the player adding a coin to a cash box 24 or by means of an account transaction.

2. The client reconnect handler 30 comprised in the client gaming machine 2 transmits a request for the reservation of a reconnect identity code together with a client identification code for identification of the specific gaming machine to the server. This request is received by the server reconnect handler 32 similarly comprised in the game application server 4.

3. The request is executed by the server reconnect handler 32 whereby a reconnect identity code is generated and stored associated with the client identification code in a database 10.

4. A player session identity code is generated and associated with the reconnect identity code in the database 10, and a player session 402 is established.

5. The reconnect identity code is transmitted to the client reconnect handler 30 and 10 is stored in local data storage 29 in the client gaming machine 2 for the purpose of enabling communication of the reconnect identity code to the player.

6. A selected game is started by the player inputting a game start command to the game client module 18 via the game application program interface 20 of the client gaming machine 2, and a request to start a game session is transmitted to the game application server 4.

7. A game session identity code is generated and stored associated with the player session identity code, a game session 402 is established, a first terminal session for the current gaming machine terminal 2 is established and coupled to the game session. A game phase 406 of a game round 404 is entered.

8. The player triggers a game round event by giving a game related input to the client game module 18 whereupon a request for a service is transmitted to the server game module 8.

9. The request is executed by the server game module 8 with the aid of the service functions of the server. The execution of this request would typically comprise the generation of a random number RNG and the determination of an outcome dependent on the RNG.

10. Execution steps that are performed by the server game module 8 for each request as well as results and outcomes of the execution male up game session data, i.e. information that applies to the currently ongoing game session. A subset of the game session data is the result of a game round event and applies to the current game phase. A selection of these game session data are compiled and cashed, i.e. temporarily stored in data storage of the server 8. The selection may vary in different execution cases and embodiments, and would preferably comprise: the bet value, the random number and the win value that are valid for the current game phase. The selection of game session data may also comprise optional pieces of information regarding the sequence of events called event history, each request and response, a pot at stake, the request, the response to the client gaming machine, game configuration information and a status indicator devised to indicate whether the game session has been completed or interrupted e.g. indicating last event=true/false.

11. The selection of game session data is stored in the database 10 and is transmitted with a response to the client gaming machine 2. The received selection of game session data is cashed, i.e. temporarily stored in data storage of the client gaming machine 2.

12. The outcome of the game round event is presented to the player for example via image output on a presentation screen of the client gaming machine 2.

13. The steps 8-12 are normally repeated until a game round is ended, for example controlled by the player or by the game application server according to predetermined rules.

14. As explained above, for each request the capability of receiving a response from the first used game application server within predetermined receiving conditions is determined. If the receiving conditions are not fulfilled, the communication from the client gaming machine is redirected to a second game application server and the game session is reconstructed and continued.

15. If an interruption occurs, i.e. the client looses contact with the server and the failover-takeover fails, the reserved reconnect identity code that is temporarily stored in the storage 29 of the client gaming machine 2 is for example printed out on a piece of paper or other suitable carrier to make up a reconnect voucher output to the player. The reconnect voucher is in a currently preferred embodiment printed with a bar code comprising the reconnect identity code and a status indicator for the interrupted game, and some text information for example about the gaming venue.

For the purpose of reconstructing the game session in the failover-takeover procedure and resume the game session the game session and the game session data is found by means of the game session identity code as a key input to the game server database as explained above.

The procedure for failover-takeover in different embodiments further comprises a selection of the following. When the client gaming machine is communicatively coupled to the second game application server and it has been determined that the second game application server shall take over the game session a player session corresponding to the one in the client gaming machine is initiated in the game application server. Preferably, only the server side state of the game session, that is the state in the game application server, is reconstructed by means of the game session data.

For the purpose of reconnecting the game and resume the game session a fully interrupted game is found by means of the reconnect identity code as a key input to the gaming system. The reconnect procedure is here explained by way of example with the reconnect voucher embodiment in which the player enters a reconnect voucher in a bar code reader of a client gaming machine of the gaming system. It should be understood that also other means of conveying the reconnect identity code to the gaming system are within the inventive concept. The reconnect voucher can for example be inserted in the same gaming machine in which the game was interrupted, a different gaming machine or in an administrative client terminal. The administrative client terminal is preferably devised only to be able to refund money or issue a monetary credit.

The procedure for reconnection comprises in one embodiment a selection of the following steps.

1. If the client gaming machine in which the game was interrupted logins with the game application server and a new player session is initiated, the client handler 36 of the game application server detects in a check procedure that this particular client gaming machine has had an interrupted game. The client identification code is associated with the previous reconnect voucher for that specific client and the stored game session data, and a new reconnect identification code is reserved and transmitted to the client gaming machine to replace the previous and activated reconnect identity code.

2. If a player starts a player session in a different client gaming machine, a new reconnect identification code is reserved in the normal manner.

3. The player inputs a reconnect voucher into the bar code reader of the client gaming machine, and the information on the reconnect voucher is read and treated under the control of the client control module 34 and the client reconnect handler 30. The information on the reconnect voucher is transmitted with a request to the game application server.

4. The game application server checks the status of the reconnect voucher and determines by means of the status indicator and information stored in the server database whether there is an interrupted game session.

5. If there is a monetary credit only, the money is credited to the player for a new game or as a refund.

6. If there is un-synchronized money, a synchronization procedure is executed.

7. If there is an interrupted game, the game is reconstructed and presented to the player in the state in which it was interrupted.

The reconstruction of an interrupted game can be implemented in various manners. One embodiment comprises of the following steps.

1. With the reconnect identity code as a key, the associated game session data is retrieved from the server database under the control of the server reconnect handler 30.

2. The server reconnect handler 30 uses the retrieved game session data as input to the server game module 8 and generates the last response from the server game module that should have been transmitted to the client gaming machine unless the interruption had occurred. In different embodiments 3. Reconnect information comprising game session data is compiled and transmitted to the client reconnect handler 30 of the client gaming machine. In one embodiment this reconnect information comprises the game identifications for the server game module and the client game module, game session data including an initial monetary balance, all requests and all responses of the event history.

4. In the client gaming machine, the client game module is initiated and the game is executed by the client reconnect handler 30 using the game session data as input up to the last completed game phase before the point of interruption, called the reconnect target point. In contrast with the normal execution of a game, the requests that are generated in the reconnect execution are discarded and after each request the game is presented with the corresponding response from the game session data. Since the client reconnect handler 30 has access to all the requests as well as the responses to the requests it is enabled that a check of a proper reconstruction of the game session can be performed. Preferably, the game is executed up to the reconnect target point without presenting the intermediate results to the player in order to speed up the execution and avoid confusing the player.

5. After the last event and thereby the last completed game phase has been executed, the corresponding result and state of the game is presented to the player via the graphical user interface and the game enters a waiting mode waiting for the next input from the player.

6. The game continues in a normal manner.

The invention has been described by way of exemplifying embodiments, but naturally there are various manners of realising the invention within the scope of the claims.

The invention claimed is:

1. A method of operating a computerized gaming system comprising a client gaming machine, a database storage structure and a plurality of game application servers being coupled to the database storage structure, the method comprising:

upon establishing a game session between the client gaming machine and a first game application server, associating the game session with a game session identity code;

associating data generated in relation to operating the game session with the game session identity code, thus giving rise to game session data, and continuously storing the game session data in the database storage structure;

responsive to receiving data indicative of an incapability of the first game application server to respond to a request sent by the client gaming machine during operating the game session, communicating from the client gaming machine to a second game application server a connection request associated with the game session and indicative of the game session identity code; and determining by the second game application server if the game session meets a takeover criterion;

and issuing by the client machine a reconnect voucher when the game session does not meet the takeover criterion, the reconnect voucher comprising data indicative of a reconnect identity code associated with the game session identity code;

using the stored game session data associated with the game session identity code for reconstructing the game session by the second game application server when the game session meets the takeover criterion, wherein establishing the game session comprises:

responsive to initiating by the client machine a player session, generating a reconnect identity code;

associating the generated reconnect identity code with a client identification code indicative of the client gaming machine;

generating a player session identity code associated with the player session;

associating the player session identity code with the reconnect identity code;

generating a game session identity code associated with the game session within the player session;

associating the game session identity code with the player session identity code and storing the game session identity code, player session identity code and the reconnect identity code in the database storage structure.

2. The method of claim 1 wherein the game session is reconstructed so that the reconstructed game session is characterized by the same result, outcome and output as the original game session.

3. The method of claim 1 further comprising:

using by the player a reconnect voucher for initializing a reconnect request from the client machine to the first game application server and/or the second game application server;

responsive to the reconnect request, retrieving by the respective game application server data associated with the game session identity code corresponding to respective reconnect identity code, the data stored in the database storage structure prior to the game session interruption;

reconstructing, by the game application server, the game session up to a point of interruption.

4. The method of claim 1, wherein the first game application server is selected by the client gaming machine from the plurality of game application servers in accordance with predetermined priority rules.

5. The method of claim 1, wherein the second game application server is selected by the client gaming machine from the plurality of game application servers in accordance with predetermined priority rules.

6. The method of claim 4, wherein the predetermined priority rules comprise at least one rule selected from a group constituted of:
   rules related to a dependency on processing load of the game application servers;
   rules related to a number of active game sessions of the game application servers;
   rules related to a round robin selection scheme;
   rules related to a randomized selection; and
   rules related to availability of respective communication link.

7. The method of claim 1, wherein the incapability of the first game application is determined in accordance with predetermined receiving condition is related to at least one parameter selected from the group consisting of:
   time of response from the first game application server;
   status parameter; and
   quality of response from the first game application server.

8. The method of claim 1, wherein data indicative of an incapability of the first game application server to respond to a request sent by the client gaming machine are received by a load balancer operatively connected to the client machine, to the first game application server and to the second game application server.

9. The method of claim 1, wherein the database storage structure comprises a plurality of databases operatively connected therebetween and implemented on different database servers.

10. The method of claim 1, wherein the game session progresses in game rounds driven by game round events, and wherein data generated in relation to operating the game session comprise data associated with each of the game round events and defining the game results.

11. The method of claim 10, wherein data associated with a game round are selected from a group constituted by data indicative of a bet value corresponding to the game round, data indicative of a generated random number corresponding to the game round and data indicative of a win value corresponding to the game round.

12. The method of claim 10, wherein data associated with the game round further comprise data indicative of game session event history and game configuration information.

13. The method of claim 1, wherein the game session progresses in game rounds driven by game round events, and wherein the game request is sent by the client machine to the first game server in response to triggering of a game round event.

* * * * *